UNITED STATES PATENT OFFICE.

THOMAS HAWKS, OF ROCHESTER, NEW YORK.

IMPROVEMENT IN BREWING MALT LIQUORS.

Specification forming part of Letters Patent No. 149,122, dated March 31, 1874; application filed March 16, 1874.

*To all whom it may concern:*

Be it known that I, THOMAS HAWKS, of the city of Rochester, in the county of Monroe and State of New York, have invented an Improved Process for the Conversion of the Starch of Barley by the Diastase of Malt into a Saccharine Solution for the Purposes of Brewing Malt Liquors, of which the following is a specification:

This invention relates to that class of processes employed in changing the chemical properties of the starch of barley while in a liquid state by the use of the diastase of malt into a sweet liquor, to be used for the purposes of brewing all kinds of malt liquors. The object of my invention is to shorten the time of the process of brewing, while at the same time it decreases the number of operations usually employed in the same, and largely to diminish the cost of the material by reducing the quantity of barley required to be malted in the ordinary mode of brewing, thereby, in the aggregate, saving a large per cent. both to the manufacturer and consumer. It consists in the conversion of the starch of barley while in a liquid state into a saccharine solution by the use of the diastase of malt for which the meal of unmalted barley and the meal of malt are mixed with water in certain specified proportions, hereinafter described, and in the application of which invention to the manufacture of all kinds of malt beverages by the method of brewing.

In carrying out my invention, take of fine meal of unmalted barley about four parts, meal of malt one part, and water raised to a temperature of 170° to 175° Fahrenheit in sufficient quantity, on its being applied to the meal of barley and meal of malt, to produce a thin mash, and thoroughly mix the same in the ordinary manner of preparing worts for brewing purposes. Let this preparation stand in the mash condition for about four hours, and then draw off the liquid. Replace the same with a supply of fresh water, having the temperature at from 170° to 175°, the same as the first preparation, and let it stand about two hours, and again draw off the liquid. Now, again, add about one-third as much water, as in preparing the first mash, for washing out and saving any saccharine matter there may be still adhering to the mass, and draw off, as before, adding it to the last drawn off. For the remainder of the brewing process proceed as usual in brewing malt liquors, clarifying and boiling with hops, regulating the quantity of water as required to suit the strength of the worts.

By this invention the time required for the operations of brewing malt liquors is materially shortened, the number of operations greatly reduced, and about one-third of the expense of malting the barley mutually saved to the producer and consumer.

Having fully described my invention, what I claim, and wish to secure by Letters Patent, is—

The process of converting the starch of barley, when in a liquid state, by the use of the diastase of malt into a saccharine solution known as wort, which, by the common operations of brewing, is made into the various kinds of malt liquors of commerce, substantially as herein shown and described.

In testimony whereof I have hereunto, in the presence of these two witnesses, subscribed my name, in the city of Rochester, New York, this 11th day of March, A. D. 1874.

THOMAS HAWKS.

Witnesses:
JAMES B. PIKE,
J. B. EDMONDS.